Mar. 13, 1923.
H. N. ATWOOD ET AL
1,448,180
COMPOSITE LAMINATED STRUCTURE
Filed Dec. 24, 1920   2 sheets-sheet 1
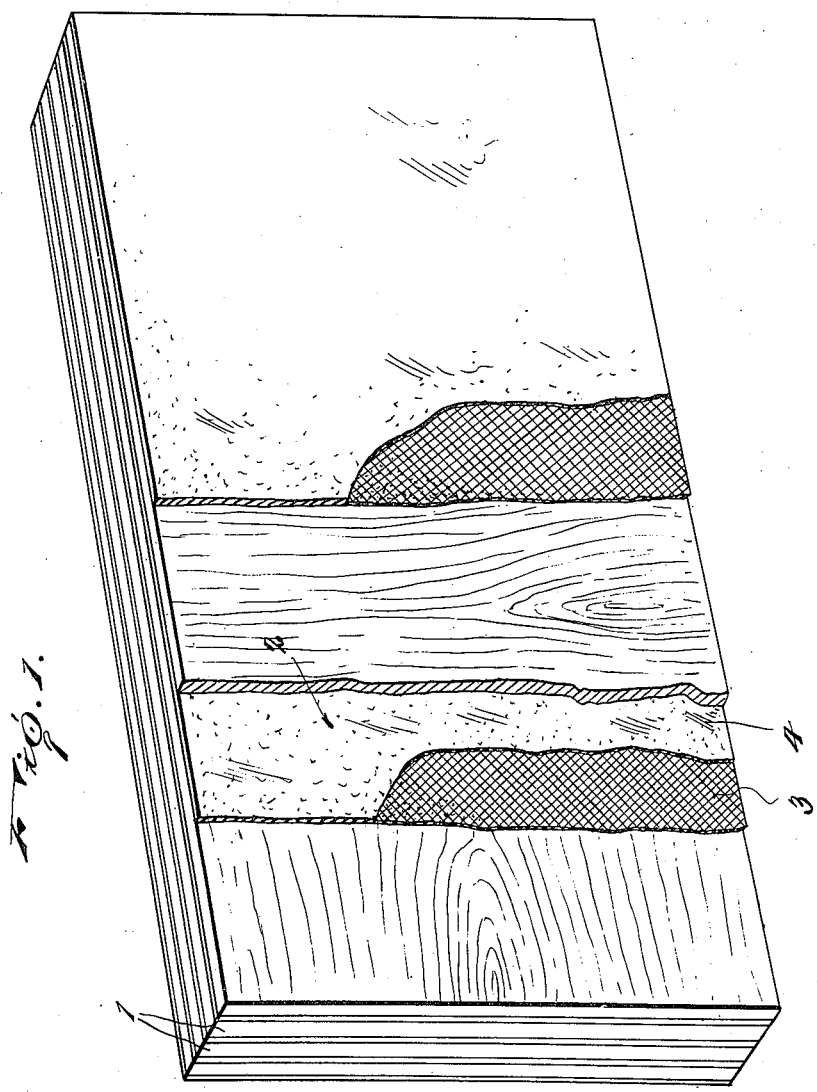
Inventors
H.N. Atwood,
G.B. Bains, 3rd.
By Lacy & Lacey, Attorneys Mar. 13, 1923.
H. N. ATWOOD ET AL
1,448,180
COMPOSITE LAMINATED STRUCTURE
Filed Dec. 24, 1920
2 sheets-sheet 2
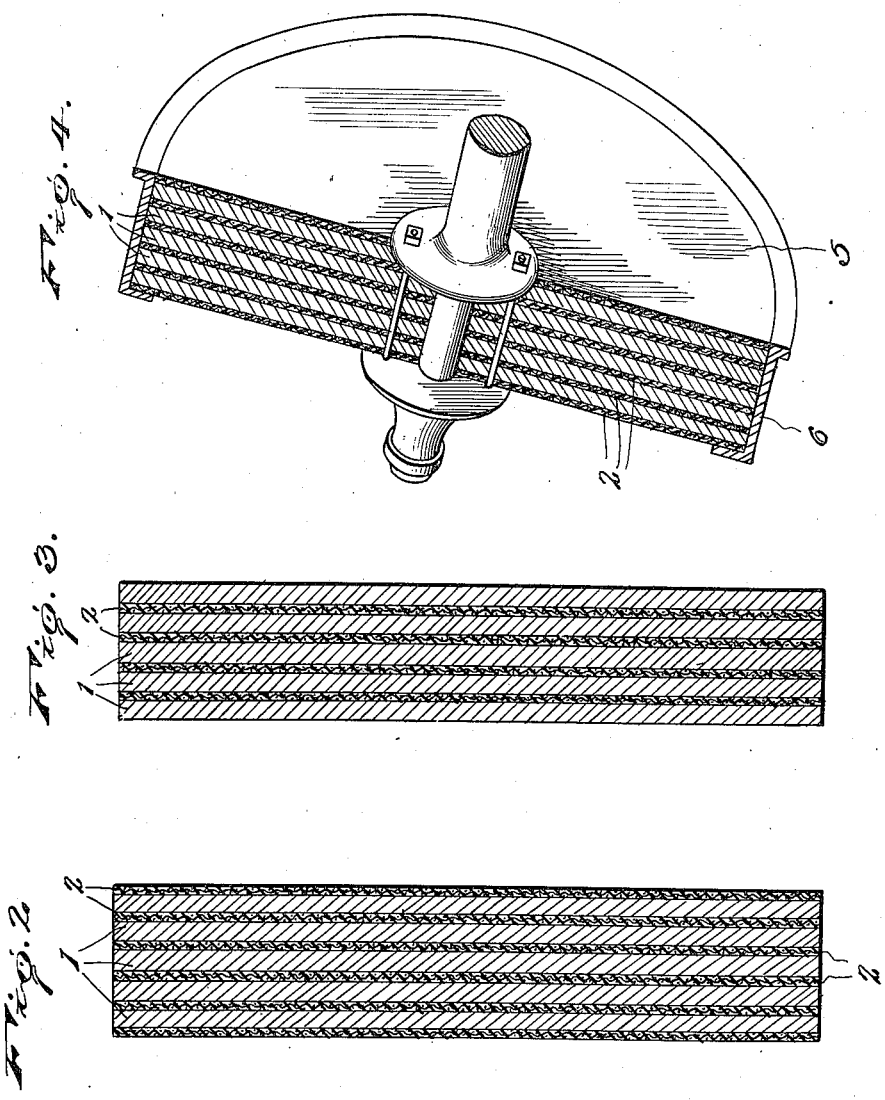
Inventors
H.N. Atwood,
G.B. Bains, 3rd.
By Lacy & Lacy, Attorneys Patented Mar. 13, 1923.

1,448,180

UNITED STATES PATENT OFFICE.

HARRY N. ATWOOD AND GEORGE B. BAINS, 3D, OF READING, PENNSYLVANIA, ASSIGNORS, BY DIRECT AND MESNE ASSIGNMENTS, TO RUBWOOD, INC., OF LAWRENCE, MASSACHUSETTS, A CORPORATION OF MASSACHUSETTS.

COMPOSITE LAMINATED STRUCTURE.

Application filed December 24, 1920. Serial No. 432,937.

*To all whom it may concern:*

Be it known that we, HARRY N. ATWOOD and GEORGE B. BAINS, 3d, citizens of the United States, residing at Reading, in the county of Berks and State of Pennsylvania, have invented certain new and useful Improvements in Composite Laminated Structures, of which the following is a specfication.

This invention has as its object to provide a novel composite laminated structure.

It has previously been proposed to unite veneer plies or slabs of wood of greater or less thickness through the medium of adhesives or cements of a water-proof nature so as to insure against separation of the plies thus united. However this previously employed method does not result in a product which as a unit is water-proof or proof against atmospheric moisture. Furthermore the product thus obtained is not proof against loss of the natural moisture content and other volatile content of the component wood parts thereof, so that as a result, the product is liable to deterioration either through the effects of atmospheric or sensible moisture, or under contrary conditions is subject to loss of its valuable original properties through evaporation or the driving off of its natural moisture content or its other volatile contents. Therefore the primary object of the present invention is to provide a composite laminated structure which will not be subject to the deteriorating effects of atmospheric or sensible moisture and which will be proof against the loss of its valuable inherent properties resulting from the presence of a natural moisture content and a natural content of other volatile matters. Therefore the present invention contemplates a composite laminated structure embodying veneer plies or wood slabs and which structure will be durable and retain for an indefinite period of time its valuable properties of strength, integrity, and so forth.

Another object of the invention is to provide a composite laminated structure which may be put to many uses and employed in the building up of many different structures, articles, or devices, and which will be capable of withstanding vibrations, shocks, and impacts, and in fact all forces of any character tending to disrupt or destroy the same, the structure comprising wood or other fibrous plies, and bonding media of such a character as to more or less elastically bond together the said fibrous plies so that the structure as a unit will be capable of absorbing any kinetic forces, such as shocks, vibrations, impacts and the like.

A further object of the invention is to provide a novel medium for bonding together wood or other fibrous plies in the production of a composite laminated structure of the class to which the invention relates, the bonding medium serving also as a reinforcement for the wood or other fibrous plies to effectually prevent disruption thereof.

Another important object of the invention is to provide a composite laminated structure possessing characteristics adapting it to be shaped to various contours and thus be build up into various forms in a manner which would be impracticable in the use of the ordinary composite veneer structures heretofore employed.

In the accompanying drawings:

Figure 1 is a perspective view illustrating the structure embodying the invention, parts being broken away and parts being shown in section;

Figure 2 is a detail sectional view through one form of the structure;

Figure 3 is a similar view through another form of the structure;

Figure 4 is a sectional perspective view illustrating the manner in which the composite material may be employed in constructing a vehicle wheel.

The product forming the subject matter of this application is produced by the process set forth in our patent issued Jan. 10, 1922, No. 1,403,143, and the said product comprises a plurality of plies 1 which are of fibrous material, such for example as wood, these plies being either in the nature of veneer, produced by slicing or rotary cutting, or in the nature of wooden slabs of a greater or less thickness as desired. Any given piece of material produced in accordance with the method above referred to and falling within this invention, may comprise any desired number of the plies 1 depending upon the use to which the material is to be put, the final thickness of the product, and the thickness of the individual plies, but in any event the plies 1 are so arranged that the grain in relatively adjacent plies will extend otherwise than parallel. Thus in Figure 1 of the drawings the grain in two of the plies illustrated extends at right angles, and while this relative disposition is a preferable one, it will be understood that the grain in adjacent plies may extend at various other relative angles within the spirit of the invention.

In building up the structure the plies 1 are alternated with bonding plies which are indicated in general by the numeral 2. Each of these bonding plies 2 comprises a sheet 3 of some foraminous material suitable for the purpose such for example as wire mesh, and this foraminous sheet is embedded in a sheet 4 of rubber or a composition of rubber and other materials. The bonding plies 2 may be built up in any suitable manner but preferably by the method set forth in our co-pending application, and this consists in applying to the sheet 3 a coating of rubber or a composition of rubber and other materials, and then passing the prepared sheet between calendering rolls or otherwise treating the same so as to cause the coating to fill the meshes of the sheet and embed the sheet in the coating.

Prior to assemblage of the plies 1 with the bonding plies 2, the said plies 1 are dipped, immersed or otherwise treated with a fluid substance which is a solvent of rubber, and after all of the plies 1 and 2 have been assembled, the entire assemblage is subjected to heat and pressure so that the solvent which has impregnated the plies 1, will take up a quantity of the rubber from the bonding plies 2 and carry the same into the pores of the said plies 1, thus effecting an intimate bonding between the said plies 1 and 2 as distinguished from a mere superficial adhesion of these plies. Preferably the plies 2 are so arranged that the strands comprising the sheet 3 will extend non-parallel to the grain in adjacent plies 1, as for example diagonally at an angle of forty-five degrees as illustrated in Figure 1 of the drawings.

As previously pointed out the plies 1 and 2 are alternated, and if it is desired to produce a structure with a water-proof rubber finish, the plies will be so arranged that two of the plies 2 will be presented at the opposite faces of the assemblage, as shown in Figures 1, 2 and 4 of the drawings. If, on the other hand, it is desired that the product shall have a wood finish, the plies are so arranged that two of the plies 1 will be presented at the opposite faces of the finished product, as shown in Figure 3.

The composite laminated structure above described may be built up in various shapes and forms and in pieces of various dimensions, and it may be worked in various ways in employing it in the construction of various articles or devices. Figure 4 of the drawings for example illustrates a piece of the material cut to circular form and comprising the body 5 of a vehicle wheel, the felly band 6 being applied to the periphery of the body 5 for the application and seating of a demountable rim in the same manner as where this felly band is carried by the ordinary wood felly. Of course Figure 4 is illustrative of only one of many different uses to which the composite laminated structure embodying the invention may be put. The structure is water-proof and has its plies so arranged that it is proof against warping and against the separation of its plies, and it may be worked with practically the same facility as ordinary wood. Also inasmuch as the plies 1 are impregnated with a rubber solvent, and in the manufacture of the product the solvent carries into the pores of the wood plies 1 a greater or less quantity of rubber constituent of the bonding plies 2, any natural moisture content in the plies 1 is effectually retained and the plies are therefore prevented from drying out and deteriorating. On the other hand the presence of the impregnating material in the plies 1 insures against the absorption of sensible moisture by these plies so that they are likewise prevented from deterioration from this source.

Having thus described the invention, what is claimed as new is:

1. A composite laminated structure comprising a ply of fibrous material, and a bonding ply comprising a sheet of foraminous material and a rubber filling, the said bonding ply being vulcanized to the fibrous ply.

2. A composite laminated structure comprising plies of fibrous material arranged with their grain extending in non-parallelism, and a bonding ply uniting the first-mentioned plies and including a sheet of foraminous material having its strands extending in non-parallel relation to the grain of the first-mentioned plies.

3. A composite laminated structure comprising plies of fibrous material impregnated with a rubber solvent, and a bonding ply comprising a sheet of foraminous material embedded in rubber and vulcanized to the first-mentioned plies.

4. A composite laminated structure comprising a ply of body material, and a bonding ply comprising a sheet of foraminous material and a rubber filling, the said bonding ply being vulcanized to the first-mentioned ply.

In testimony whereof we affix our signatures.

HARRY N. ATWOOD. [L. S.]
GEORGE B. BAINS, 3D. [L. S.]